Patented Nov. 13, 1928.

1,691,310

UNITED STATES PATENT OFFICE.

EDWARD H. SNYDER AND WILLIAM D. GREEN, OF BAUER, UTAH, ASSIGNORS TO COMBINED METALS REDUCTION COMPANY, OF BAUER, UTAH, A CORPORATION OF UTAH.

CONCENTRATION OF ORES.

No Drawing. Application filed July 2, 1925. Serial No. 41,200.

This invention relates to the treatment of ores for the recovery of the valuable metals contained therein by first treating said ores with a solution containing an alkaline thiosulfate for the purpose of dissolving all or part of said valuable metals then adding an alkaline or alkaline earth sulfid or polysulfid for the purpose of precipitating said metals as sulfids, and then separating the precipitated sulfids, the natural sulfids in the ore, and the mineral particles to which the precipitated sulfids adhere, from the gangue in said ore by means of froth flotation.

The ores to which our process is especially applicable are those containing metal oxides, carbonates, chlorides, sulfates, and arsenates which are soluble in an alkaline thiosulfate, and which can be precipitated from thiosulfate solutions by alkaline or alkaline earth sulfids or polysulfide.

We have discovered that if ores carrying silver chloride are first treated with a solution of an alkaline thiosulfate and then an alkaline or alkaline earth sulfid or polysulfid be added, and then subjected to froth flotation, a concentrate rich in silver can be obtained. A sufficient quantity of the alkaline thiosulfate is used to dissolve all or part of the silver chloride, and a sufficient quantity of an alkaline or alkaline earth sulfid or polysulfid is introduced to precipitate as sulfid, the silver which has gone into solution, and to coat that portion of the silver chloride whose surfaces have been acted upon, but which has not gone into solution, with silver sulfid. The thus prepared pulp is then subjected to froth flotation whereby the silver may be recovered as a concentrate rich in silver.

We have also discovered that if ores carrying oxidized lead minerals such as lead sulfate and (or) lead carbonate are first treated with a solution of an alkaline thiosulfate and then an alkaline or alkaline earth sulfid or polysulfid be added, and the thus prepared pulp then subjected to froth flotation, a concentrate rich in lead can be obtained. A sufficient quantity of alkaline thiosulfate is used to dissolve all or part of the lead contained in oxidized lead minerals and a sufficient quantity of an alkaline or alkaline earth sulfid or polysulfid introduced to precipitate as sulfid the lead which has gone into solution. The thus prepared pulp is then subjected to froth flotation whereby the lead may be recovered as a concentrate rich in lead.

We have discovered that undissolved oxidized lead minerals are coated with precipitated sulfid in the above treatment and can be recovered by flotation along with the natural sulfids in the ore. We have also discovered that any silver associated with the lead will be found in the lead concentrate.

If it is found necessary to use enough thiosulfate to dissolve practically all of the minerals in a high grade ore, the thiosulfate will be regenerated upon the addition of the sulfid, and the thiosulfate may be recovered by dewatering the waste residue. The recovered water containing the thiosulfate can then be used over again.

We have found that in the case of certain ores it is advantageous to introduce the alkaline thiosulfate into the fine grinding apparatus during the grinding operation. In the case of other ores it is sufficient to thoroughly mix the alkaline thiosulfate with the ore pulp in any appropriate mixing vessel or tank. The alkaline or alkaline earth sulfid or polysulfid is introduced after the alkaline thiosulfate. After the preliminary mixing has taken place the ore pulp is introduced into a flotation apparatus of any of the well known types. The flotation treatment is conducted in the presence of an appropriate frothing agent, such as oil.

The quantity of thiosulfate used and the time of agitation depends entirely upon the ore being treated. We have found that with certain ores a fraction of 1% of thiosulfate is sufficient, while with other ores it is necessary to dissolve practically all of the minerals in order to make a high recovery.

In the case of a copper carbonate ore (malachite) with which was associated silver, in the form of chloride and sulfid, we found that a high recovery of the copper and silver could be obtained by grinding the ore with three pounds of sodium thiosulfate per ton of ore being treated, and then treating the said ore pulp in a suitable mixing vessel with three pounds of sodium sulfid. After this preliminary treatment, the ore pulp was introduced into a flotation apparatus and subjected to flotation separation with agitation and aeration with a small quantity of pine oil. A float concentrate was obtained rich in silver and copper, the residue being low in silver and copper. The copper carbonate (malachite) was not visibly affected by the quantity of sodium sulfid used, although the silver was precipitated.

The following is an example of the application of this invention to the copper-silver ore above referred to. The ore assayed silver 19.48 oz., copper 0.4%. It will be understood that we do not confine ourselves to these conditions. The ore with an equal weight of water was ground in a ball mill to which was added an amount of sodium thiosulfate equivalent to three pounds per ton of ore. When the ore had been sufficiently ground the pulp was removed from the ball mill and introduced into a mixing vessel where a quantity of sodium sulfid equivalent to three pounds per ton of ore was added and the whole agitated for ten minutes. At the end of this time additional water was added to make a solid to water ratio of 1 to 3, and the resultant pulp was now introduced into the flotation machine and subjected to agitation and aeration with 0.75 pound per ton of a mixture consisting of coal tar oil 75%, and yellow pine oil 25%. A rich copper-silver froth concentrate was obtained which assayed silver 478.2 oz., copper 12.3%, and a tailing remained which assayed silver 3.3 oz., copper 0.075%.

The following is an example of the application of this invention to the treatment of an oxidized lead carbonate ore from the Honerine mine of the Combined Metals Reduction Company at Bauer, Utah. The ore assayed lead 7.9%, silver 5.15 oz. It will be understood that we do not confine ourselves to these conditions. The ore was ground with an equal weight of water in a ball mill to which was added sodium thiosulfate equivalent to five pounds per ton of ore being treated. After sufficient grinding, the pulp was removed from the ball mill, placed in a mixing vessel and agitated for ten minutes with sodium sulfid equivalent to three pounds per ton of ore being treated. After this agitation the pulp was introduced into a flotation machine and subjected to agitation and aeration with a small quantity of a frothing agent consisting of coal tar oil 80% and yellow pine oil 20%. A float concentrate was obtained assaying lead 21.2%, and silver 7.4 oz., making a recovery of 81% of the lead and 80% of the silver. The residue assayed lead 2.0% and silver 1.77 oz.

In this specification the term "ores", is intended to include concentrates, tailings, slimes, and other products containing valuable minerals.

What we claim, is:

1. A process for treating ores containing at least one of the metals of the group, silver, lead, copper, comprising subjecting the ores to the action of an alkaline thiosulfate for dissolving at least a portion of any of the said metals when present, precipitating as sulfid from the said alkaline solution any of the said metals, which are in solution, separating the precipitated sulfid, any natural sulfids in the ore and any mineral particles to which a precipitated sulfid adheres, from the gangue of said ore by means of froth flotation while regenerating the solvent by the action of the precipitant upon the ore solution.

2. A process for treating ores, such as oxides, carbonates, chlorides, sulfates and arsenites containing at least one of the metals of the group, silver, lead, copper, comprising subjecting the ores to the action of an alkaline thiosulfate for dissolving at least a portion of any of the said metals, when present, precipitating as sulfid from the said alkaline solution any of the said metals, which are insolution, separating the precipitated sulfid, any natural sulfids in the ore and any mineral particles to which a precipitated sulfid adheres, from the gangue of said ore by means of froth flotation, while regenerating the solvent by the action of the precipitant upon the ore solution.

3. A process for the concentration of the valuable metals contained in ores such as silver chloride associated with silver sulfid which comprises first subjecting the ores to the dissolving action of an alkaline thiosulfate, precipitating from the alkaline solution the dissolved silver as sulfid, with simultaneous regeneration of the thio-sulfate solvent, separating the precipitated sulfids, the natural sulfid in the ore, and the mineral particles to which the precipitated sulfid adheres, from the gangue of said ore by means of froth flotation.

4. A process for the concentration of the valuable metals contained in ores such as oxidized lead compounds which comprises subjecting the ores to the dissolving action of an alkaline thiosulfate, precipitating from the alkaline solution the dissolved lead as sulfid with accompanying regeneration of the thiosulfate separating the precipitated sulfids, the natural sulfids in the ore, and the mineral particles to which the precipitated sulfids adhere, from the gangue of said ore by means of froth flotation.

5. A process for the concentration of the valuable metals contained in ores which comprises subjecting the ores to the dissolving action of an alkaline thiosulfate, precipitating the dissolved metals as sulfids, and at the same time regenerating the thiosulfate solution by precipitating from the alkaline solution the dissolved metals as sulfids, with simultaneous regeneration of the thiosulfate separating the precipitated sulfids, the natural sulfids in the ore, and the mineral particles to which the precipitated sulfids adhere from the gangue of said ore by means of froth flotation, then separating the gangue from the thiosulfate solution which has been regenerated, by dewatering and using said thiosulfate solution again for the treatment of fresh ore as outlined above.

6. A process for the treating of ores containing at least one of the metals of the group, silver, lead, copper which comprises first subjecting the ores to the action of an alkaline thiosulphate and then to flotation in the presence of a soluble sulphide.

7. A process for the treatment of oxidized ores containing at least one of the metals of the group, silver, lead, copper, which comprises subjecting the ores to a flotation operation in a solution containing an alkaline thiosulfate in the presence of a soluble sulphide, thereby obtaining a float concentrate of the values free from gangue, with the accompanying regeneration of the thiosulphate.

8. A process for the treatment of ores containing oxidized minerals of at least one of the metals of the group, silver, lead, copper, which comprises subjecting the ores to a flotation operation in a solution containing sodium thiosulfate in the presence of sodium sulphide, thereby obtaining a float concentrate of the values free from gangue, while regenerating the thiosulphate.

In testimony whereof, we affix our signatures.

EDWARD H. SNYDER.
WILLIAM D. GREEN.